United States Patent [19]
Grant et al.

[11] Patent Number: 5,722,163
[45] Date of Patent: Mar. 3, 1998

[54] BEARING AND A METHOD FOR MOUNTING THEM IN SCREW COMPRESSOR

[76] Inventors: Stanley R. Grant, 3190 Reston Dr., Baldwinsville, N.Y. 13027; Peter T. Schutte, 870 Westmoreland Ave., Syracuse, N.Y. 13210

[21] Appl. No.: 317,445

[22] Filed: Oct. 4, 1994

[51] Int. Cl.[6] ................................. B23P 15/00
[52] U.S. Cl. ................. 29/898.07; 29/898.09; 384/626
[58] Field of Search ............. 29/898.07, 898.09; 384/626

[56] References Cited

U.S. PATENT DOCUMENTS

| | | | |
|---|---|---|---|
| 586,630 | 2/1897 | Fox | 29/898.09 |
| 1,748,971 | 3/1930 | Buckwalter | 29/898.07 |
| 1,748,973 | 3/1930 | Buckwalter | 29/898.07 |
| 2,438,214 | 3/1948 | Horger | 29/898.07 |
| 2,627,120 | 2/1953 | Hotchkiss | 29/898.09 |
| 3,388,854 | 6/1968 | Olofsson et al. | 230/143 |
| 3,947,078 | 3/1976 | Olsaker | 308/207 R |
| 4,142,765 | 3/1979 | Olsaker | 308/207 R |
| 4,336,641 | 6/1982 | Bhatia | 29/898.09 |
| 4,452,654 | 6/1984 | KaDell, Jr. | 29/898.07 |
| 5,072,993 | 12/1991 | Dickerson | 384/626 |
| 5,115,558 | 5/1992 | Bernhardt | 384/626 |
| 5,129,156 | 7/1992 | Walker | 384/626 |
| 5,161,904 | 11/1992 | Craft | 384/626 |
| 5,286,119 | 2/1994 | Fischer | 384/626 |
| 5,366,299 | 11/1994 | Hughes | 384/626 |
| 5,386,630 | 2/1995 | Fox | 29/898.09 |

*Primary Examiner*—Larry I. Schwartz
*Assistant Examiner*—Marc C. Butler

[57] ABSTRACT

Rolling element bearings capable of both axial and radial restraint are readily removably mounted on the shaft of each screw rotor so as to allow a clearance type radial fit between the bearing and shaft. A washer engages the inner race of the bearing which also engages a shim. A bolt squeezes the inner race between the washer and shim to secure the bearing in place while the shim thickness/height determines the position of the rotor within the casing.

8 Claims, 3 Drawing Sheets

BEARING AND A METHOD FOR MOUNTING THEM IN SCREW COMPRESSOR

BACKGROUND OF THE INVENTION

In twin rotor screw compressors, the pressure gradient is normally in one direction during operation such that fluid pressure tends to force the rotors towards the suction side. The rotors are mounted in bearings at each end so as to provide both radial and axial restraint. The end clearance of the rotors at the discharge side is critical to sealing and the fluid pressure tends to force open the clearance. Also, the axial forces tend to drive the suction end of the rotors into the casing which can damage the rotors if contact between the rotor(s) and casing is allowed to occur.

Rolling element bearings capable of both axial and radial restraint are mounted to a shaft. Current practice dictates either an interference fit or key between the bearing and shaft to prevent relative rotation between the two components. The use of a key is more costly due to the requirement for additional parts (keys) and features (keyslots) which can also stack up tolerances for the various parts/features. The use of an interference fit makes assembly more laborious in that the bearing is secured to the shaft after the shaft is set in place but before the accuracy of the placement of the bearing is determined. Once secured in place, the bearing cannot be easily relocated to correct any error in its positioning since the interference fit is normally accomplished by pressing into place or by heating the bearing and letting it cool and shrink around the shaft. After determining the accuracy of placement, it may be necessary to relocate the interference fitted bearing(s) on the shaft(s) using a press and special tooling to properly locate the rotor(s) in the casing. Even with special equipment, relocation of interference - fitted bearings is difficult and uncertain at best.

SUMMARY OF THE INVENTION

Rolling element bearings capable of both axial and radial restraint are readily removably mounted to a shaft of a screw rotor in such a manner that the mounting allows a clearance type radial fit between the bearing and shaft. The bearing is then axially clamped in place. This allows for a simple assembly and disassembly of the bearing such that shimming the bearing to properly locate the bearing is facilitated. Thus, the present invention provides ease of assembly, regardless of bearing type and, specifically, enables the use of cost effective tapered roller bearings which would otherwise be impractical due to the requirement of an interference fit, or other method of axial and rotational restraint prohibiting facile assembly and disassembly.

It is an object of the invention to provide a bearing mounting method permitting simple assembly and disassembly.

It is a further object of this invention to provide a tapered roller bearing arrangement for axially, and, if desired, radially supporting a screw rotor.

It is another object of this invention to readily adjust the clearance between the shaft and casing in a screw compressor. These objects, and others as will become apparent hereinafter, are accomplished by the present invention.

Basically, the bearing is positioned axially on the shaft of the rotor with shims therebetween. To prevent relative rotation, radial, and axial movement of the bearings with respect to the shaft, axial clamping is achieved through a washer and bolt. Radial positioning is accomplished with a minimum radial clearance between the bearing and the shaft. The rotors are set in place in the casing and the clearance is determined. If required, the bearing is removed from the shaft and one or more shims are removed, added or replaced with thicker or thinner shims until an acceptable clearance is obtained.

BRIEF DESCRIPTION OF THE DRAWINGS

For a fuller understanding of the present invention reference should now be made to the following detailed description thereof taken in conjunction with the accompanying drawings wherein.

DESCRIPTION OF THE PREFERRED EMBODIMENT

Figure 1:
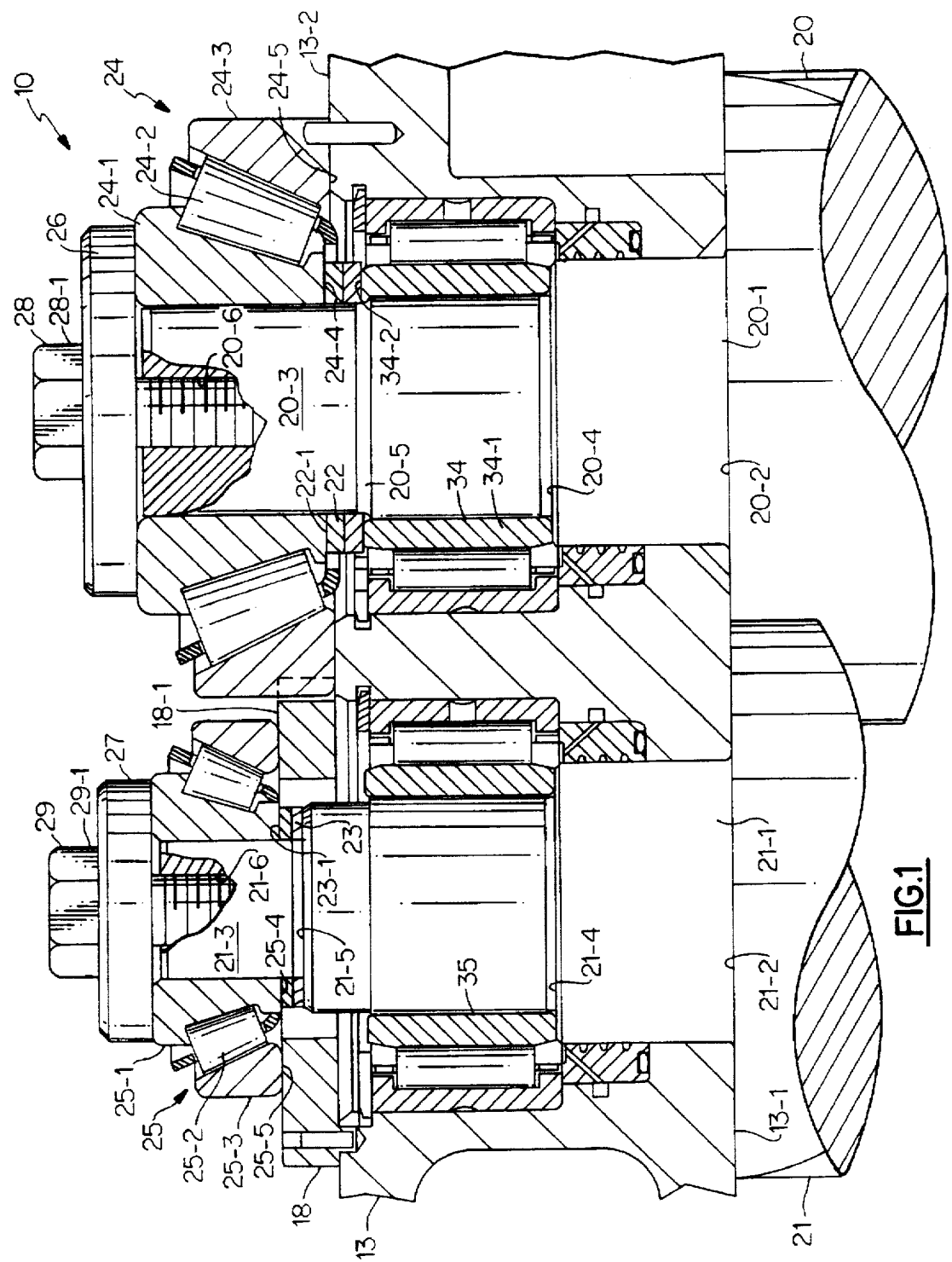
FIG. 1 is a partially sectioned discharge end view of the rotors of a screw compressor.
Figure 2:
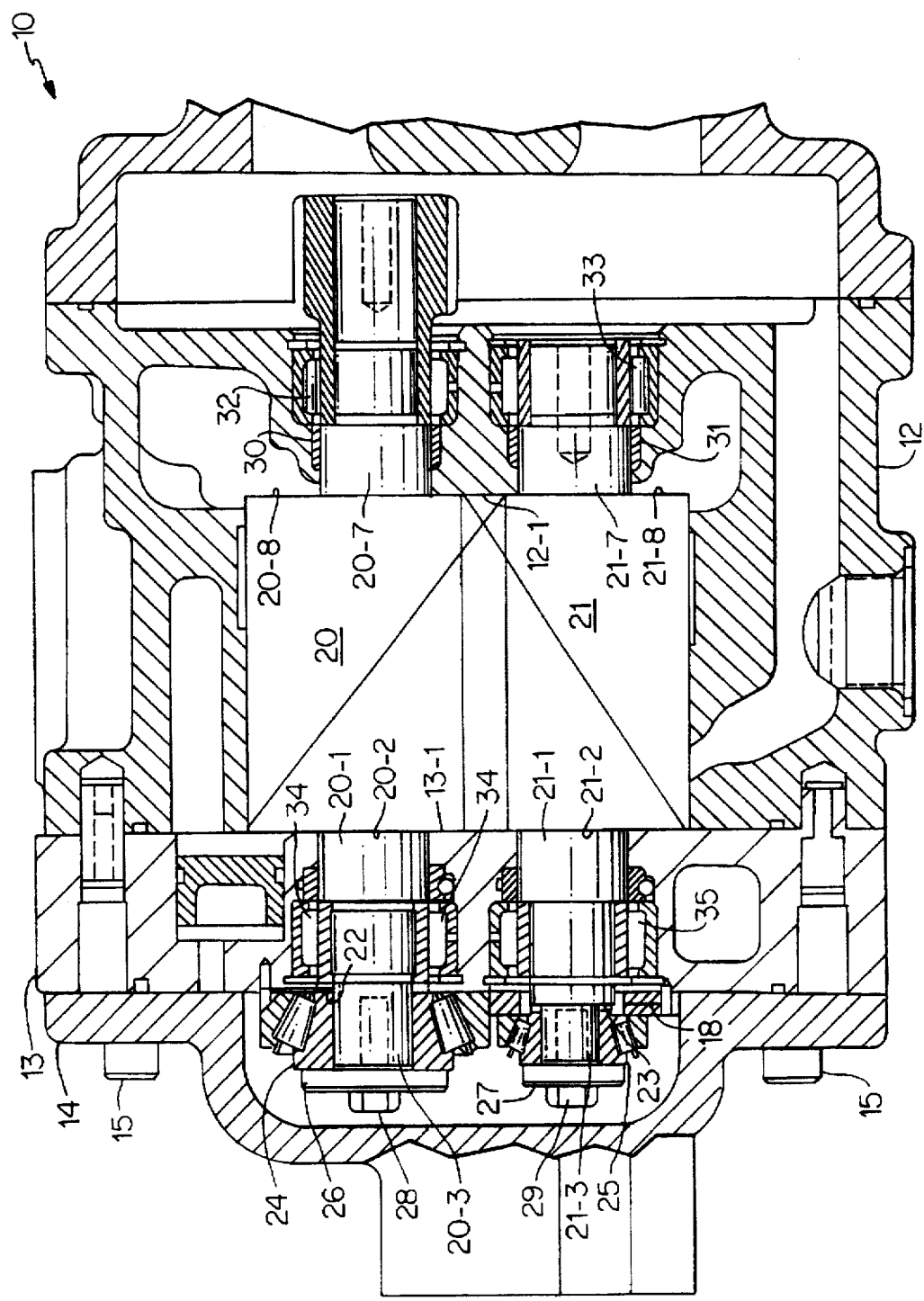
FIG. 2 is a sectional of a portion of a screw compressor.

In FIGS. 1 and 2 the numeral 10 generally designates a twin rotor screw compressor having a male rotor 20 and a female rotor 21. Rotor 20 has a shaft portion 20-1 including an outer reduced diameter portion 20-3, a first shoulder 20-2 is formed between shaft portion 20-1 and the rotor 20. A second shoulder 20-4 and a transition 20-5 are also formed on shaft portion 20-1. A threaded axial bore 20-6 is formed in shaft portion 20-1. One or more shims 22 surround reduced portion 20-3 and are supported by the inner race 34-1 of bearing 34. Bearing 24, which includes inner race 24-1, roller elements 24-2 and outer race 24-3, is located with a small clearance in a surrounding relationship to the reduced diameter portion 20-3. The bottom surface 24-4 of inner race 24-1 is in engagement with surface 22-1 of shim 22 and the bottom surface 24-5 of outer race 24-3 overlies surface 13-2 of outlet casing 13. Washer 26 overlies bearing 24 and bolt 28 is threadably received in bore 20-6. When bolt 28 is tightened, its head 28-1 engages washer 26 which, in turn, engages inner race 24-1 which engages shim 22 with surface 24-4. It should be obvious that removal of bolt 28 permits the removal of washer 26 and bearing 24 as well as the addition, removal or replacement of shims 22.

Similarly, rotor 21 has a shaft portion 21-1 including an outer reduced diameter portion 21-3, a first shoulder 21-2 is formed between shaft portion 21-1 and the rotor 21. A second shoulder 21-4 and a third shoulder 21-5 are also formed on shaft portion 21-1. A threaded axial bore 21-6 is formed in shaft portion 21-1. One or more shims 23 surround reduced portion 21-3 and are supported by shoulder 21-5. Bearing 25, which includes inner race 25-1, roller elements 25-2 and outer race 25-3, is located with a small clearance in a surrounding relationship to the reduced diameter portion 21-3. The bottom surface 25-4 of inner race 25-1 is in engagement with surface 23-1 of shim 23 and the bottom surface 25-5 of outer race 25-3 overlies surface 18-1 of spacer 18. Washer 27 overlies bearing 25 and bolt 29 is threadably received in bore 21-6. When bolt 29 is tightened, its head 29-1 engages washer 27 which, in turn, engages inner race 25-1 which engages shim 23 with surface 25-4. As in the case of rotor 20, removal of bolt 29 permits the removal of washer 27, and bearing 25 as well as the addition, removal or replacement of shims 23. Referring to FIG. 2, rotors 20 and 21 and their suction side shaft portions 20-7 and 21-7 are supportingly received in rotor housing 12 with shaft portions 20-7 and 21-7 being sealed by seals 30 and 31, respectively, and supported by roller bearings 32 and 33, respectively. Shaft portions 20-1 and 21-1 are supportingly received in outlet casing 13 and supported by roller bearings 34 and 35, respectively. Reduced diameter portions 20-3 and 21-3 extend beyond outlet casing 13 and are received in bearings 24 and 25. Bearing cover 14 is secured to outlet casing 13 by bolts 15.

Assuming bearing cover 14 to be removed, some axial movement of rotors 20 and 21 is possible in the way of properly locating the rotors for operation. Surface 12-1 of rotor housing 12 represents a fixed surface which, in proper assembly, will be separated from shoulders 20-8 and 21-8 of rotors 20 and 21, respectively, by a gap preferably on the order of 0.01 inches, or less. Surface 13-1 of outlet casing 13 also represents a fixed surface which, in proper assembly, will be separated from shoulders 20-2 and 21-2 of rotors 20 and 21, respectively, by a normal gap preferably on the order of 0.005 inches, or less. Since surfaces 12-1 and 13-1 are fixed, the gaps are adjusted by axial movement of the rotors 20 and 21 with respect thereto. For rotor 20, the distance between shoulder 20-2 and the upper surface 34-2 of inner race 34-1 of bearing 34 is a fixed distance as is the distance between surface 13-1 and 24-4. It follows that, by adjusting shims 22, the distance between surfaces 13-1 and 20-2, which represents the position of the rotor 20 with respect to the outlet casing 13, is changed as is the distance between surfaces 24-4 and 34-2. In this manner the clearance between surface 13-1 and shoulder 20-2 is changed and can be set to a predetermined value by selection of the proper shims 22. Similarly, by adjusting shims 23, the distance between surfaces 13-1 and 21-2 changes since the distance between shoulder 21-2 and shoulder 21-5 is fixed as is the distances between surfaces 13-1 and 25-4.

Bearings 24 and 25 are secured to reduced shaft portions 20-3 and 21-3 by bolts 28 and 29, respectively. Bolt 28 squeezes the inner race 24-1 of bearing 24 the inner race 34-1 of bearing 34 and shims 22 between second shoulder 20-4 of rotor 20 and washer 26, and in accordance with the thickness of shims 22 axially positions rotor 20 in rotor housing 12 and with respect to outlet casing 13 so as to adjust the end gaps of the rotor 20. Similarly, bolt 29 squeezes the inner race 25-1 of bearing 25 and shims 23 so as to adjust the end gaps of rotor 21. As noted above, the clearance of the end gaps of the rotors 20 and 21 with surfaces 12-1 and 13-1 is critical and the facile adjustment thereof is an essential of the present invention.

Figure 3:
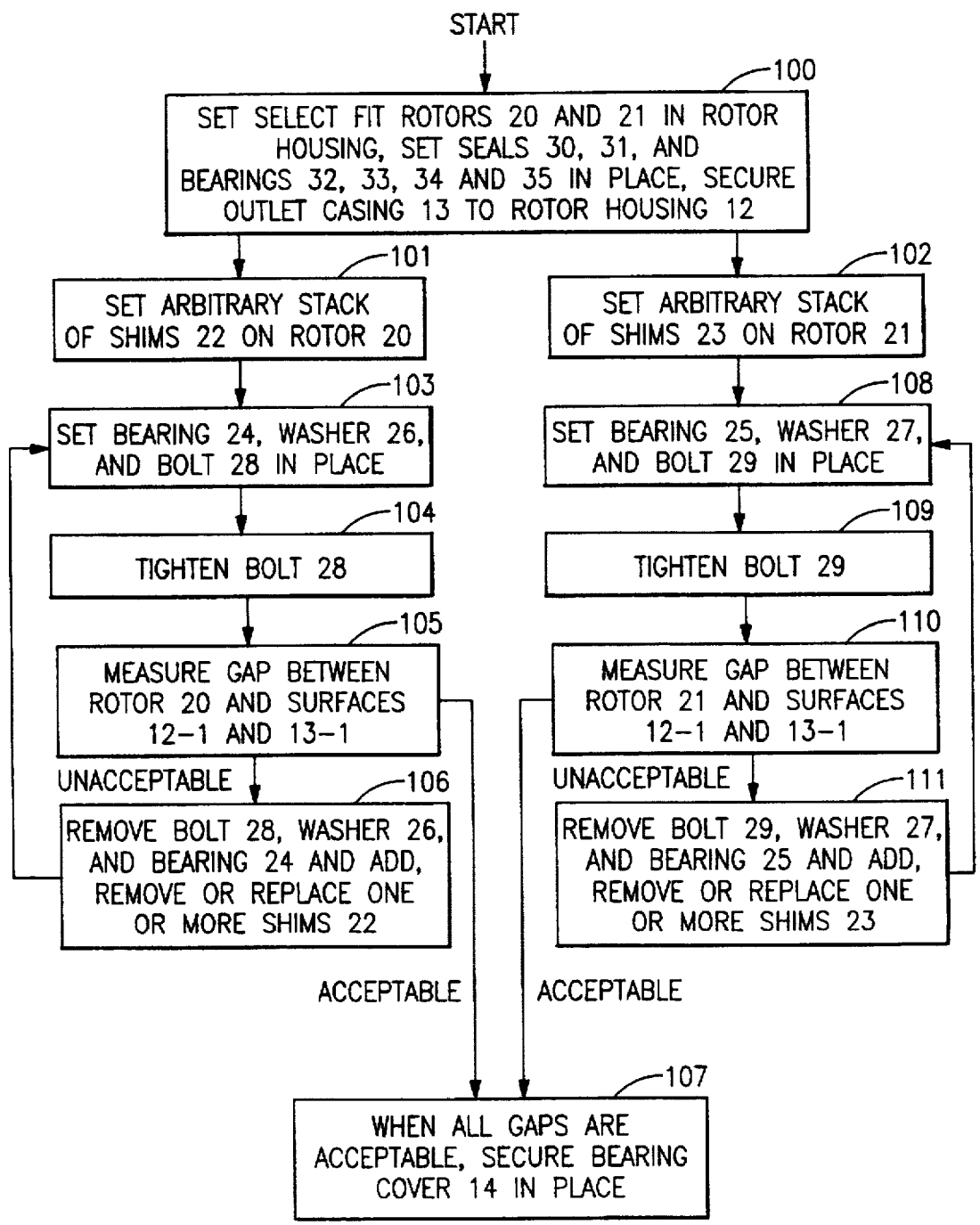
FIG. 3 is a flow diagram of the method of the present invention.

Screw compressor 10 is assembled with a select fit. Initially, as indicated by block 100 of FIG. 3, the selected rotors 20 and 21 are set in place in rotor housing 12 and seals 30 and 31 and bearings 32, 33 34 and 35 are set in place and outlet casing 13 is secured to rotor housing 12. As indicated by blocks 101 and 102, arbitrary stacks of shims 22 and 23 are set on rotors 20 and 21, respectively. Bearing 24, washer 26 and bolt 28 are set in place, as indicated by block 103, and bolt 28 is tightened, as indicated by block 104. The gaps between shoulders 20-2 and 20-8 of rotor 20 and surfaces 13-1 and 12-1, respectively are measured, as indicated by block 105 and, if acceptable, go to block 107, but, if unacceptable, go to block 106. In block 106, bolt 28, washer 26 and bearing 24 are removed and shim 22 is adjusted by adding, removing or replacing shims to correct the gaps. The procedure then returns to block 103. With stack of shims 23 in place, as indicated by block 102, bearing 25, washer 27 and bolt 29 are set in place, as indicated by block 108, and bolt 29 is tightened, as indicated by block 109. The gaps between the shoulders 21-2 and 21-8 of rotor 21 and surfaces 13-1 and 12-1, respectively, are measured, as indicated by block 110 and, if acceptable, go to block, 107, but, if unacceptable, go to block 111. In block 111, bolt 29, washer 27, and bearing 25 are removed and shim 23 is adjusted by adding, removing or replacing shims to correct the gaps. The procedure then returns to block 108. When all of the gaps between rotors 20 and 21 and surfaces 12-1 and 13-1 are acceptable, as indicated by block 107, the rotors 20 and 21 are properly located and bearing cover 14 is secured in place. From the foregoing description it should be readily evident that the locating of rotors 20 and 21 and the setting of the gaps is readily accomplished.

Although a preferred embodiment of the present invention has been illustrated and described other changes will occur to those skilled in the art. For example, the present invention could be applied to a three rotor screw machine. Also, initially blocks 101, 103 and 104 as well as blocks 102, 108 and 109 could all partially precede the portion of block 100 designated "secure outlet casing 13 to rotor housing 12". In this manner, the rotors would be subassembled to the outlet casing before insertion into the rotor housing. However, blocks 103 and 104 as well as blocks 108 and 109 would also remain as part of the iterative procedure of determining the proper shim thickness. Also, this procedure would be essentially unchanged if, for example, the rotor housing 12 were replaced with a fixture which simulated the rotor housing for the purpose of shim selection and the completed subassembly with correct shims was later installed into the rotor housing 12. While tapered roller element bearings have been illustrated and described, contact ball bearing, spherical roller thrust bearing, tapered roller thrust bearings, deep groove ball bearings and other types of ball bearings may also be used. Further, although the shims have been specifically described as being between the inner race and another member, the shims may be located between the outer race and a member providing a fixed reference. Specifically, shims may be located between outer race 24-3 of bearing 24 and surface 13-2 of outlet casing 13 and between outer race 25-3 of bearing 25 and surface 18-1 of spacer 18 or between spacer 18 and surface 13-2 of outlet casing 13. Shims 22 and 23 might also be present, but they would not be adjusted to reposition the members. Repositioning would take place by adding, removing or replacing the shim(s) coacting with the outer race(s). It is therefore intended that the present invention is to be limited only by the scope of the appended claims.

What is claimed is:

1. A method for mounting bearings in screw machines comprising the steps of:

selecting a pair of screw rotors having shaft portions extending axially therefrom;

setting the selected pair of rotors in a rotor housing;

securing an outlet casing to the rotor housing such that a shaft portion of each rotor extends beyond the outlet casing;

for each rotor performing the sequential steps of:
1) setting an arbitrary stack of shims surrounding the shaft portion;
2) placing a bearing on the shaft portion;
3) removably securing the bearing in place so as to engage the stack of shims and thereby axially locating the rotor;
4) measuring any axial gaps between the rotor and adjacent structure;
5) removing the bearing;
6) adding, removing or replacing one or more of the shims;

7) replacing the bearing;

8) determining if all axial gaps are acceptable; and 9) repeating steps 5–8 until all axial gaps are acceptable.

2. The method of claim 1 wherein the step of removably securing the bearing in place includes securing an inner race of the bearing by threading a bolt into the shaft portion to cause axial engagement with the inner race which is secured thereby.

3. The method of claim 2 wherein said bearing is a tapered element bearing.

4. A method for mounting bearings to axially locate rotors in screw machines comprising the steps of:

selecting a pair of screw rotors having shaft portions extending axially therefrom;

setting the selected pair of rotors in a rotor housing;

securing an outlet casing to the rotor housing such that a shaft portion of each rotor extends beyond the outlet casing;

sealing and supporting each shaft portion;

for each rotor performing the sequential steps of:

1) setting an arbitrary stack of shims surrounding the shaft portion;

2) placing a rolling element bearing capable of both axial and radial restraint on the shaft portion;

3) removably securing the bearing in place so as to engage the stack of shims and thereby axially locating the rotor;

4) measuring any axial gaps between the rotor and adjacent structure;

5) removing the bearing;

6) adding, removing or replacing one or more of the shims;

7) replacing the bearing;

8) determining if all axial gaps are acceptable;

9) repeating steps 5–8 until all axial gaps are acceptable; and 10) securing a bearing cover to the rotor housing.

5. The method of claim 4 wherein the step of removably securing the bearing in place includes securing an inner race of the bearing by threading a bolt into the shaft portion to cause axial engagement with the inner race which is secured thereby.

6. A method for mounting bearings in screw machines comprising the steps of:

selecting a pair of screw rotors having shaft portions extending axially therefrom;

setting the selected pair of rotors in an outlet casing such that a shaft portion of each rotor extends beyond the outlet casing;

setting an arbitrary stack of shims surrounding the shaft portion of each rotor;

placing a bearing on the shaft portion of each rotor;

removably securing each bearing in place so as to engage the stack of shims and thereby axially locating the rotors to thereby define a subassembly;

securing an outlet casing to the rotor housing;

for each rotor performing the sequential steps of:

1) measuring any axial gaps between the rotor and adjacent structure;

2) removing the bearing 3) adding, removing or replacing one or more of the shims;

4) replacing the bearing on the shaft portion;

5) removable securing the bearing in place so as to engage the shims;

6) determining if all axial gaps are acceptable; and 7) repeating steps 2–6 until all axial gaps are acceptable.

7. The method of claim 6 wherein the step of removably securing the bearing in place includes securing an inner race of the bearing by threading a bolt into the shaft portion to cause axial engagement with the inner race which is secured thereby.

8. The method of claim 7 wherein said bearing is a tapered element bearing.

* * * * *